O. MOORE.

SLIDING TROLLEY.

APPLICATION FILED OCT. 1, 1921.

Reissued Dec. 20, 1921. 15,252.

INVENTOR.
OTTO MOORE.

BY Lothrop & Lothrop

ATTORNEYS.

UNITED STATES PATENT OFFICE.

OTTO MOORE, OF FRANKFORT, INDIANA, ASSIGNOR, BY MESNE ASSIGNMENTS, OF ONE-HALF TO AUTOMATIC SLIDING TROLLEY COMPANY, OF FRANKFORT, INDIANA, A CORPORATION.

SLIDING TROLLEY.

15,252. Specification of Reissued Letters Patent. Reissued Dec. 20, 1921.

Original application filed April 26, 1920, Serial No. 376,765. Renewed July 11, 1921, Serial No. 483,951. Original No. 1,387,897, dated August 16, 1921. Application for reissue filed October 1, 1921. Serial No. 504,806.

*To all whom it may concern:*

Be it known that I, OTTO MOORE, a citizen of the United States, residing at Frankfort, in the county of Clinton and State of Indiana, have invented a new and useful Sliding Trolley, of which the following is a specification.

This invention relates to a sliding trolley adapted for use in connection with electric cars, and has for an object the provision of means for prolonging the life of such devices.

Another object of this invention is to provide a trolley having a sliding contact surface of relatively great dimensions, and, also, providing means for insuring continued contact of the trolley with the conducting wire irrespective of the direction of travel of the car or vehicle.

A further object of this invention is to provide a trolley of generally improved construction, whereby the device will be simple, durable and inexpensive in construction, as well as convenient, practical, serviceable and efficient in its use.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

The invention has been illustrated in its preferred embodiments in the accompanying drawings, wherein.

Figure 1:
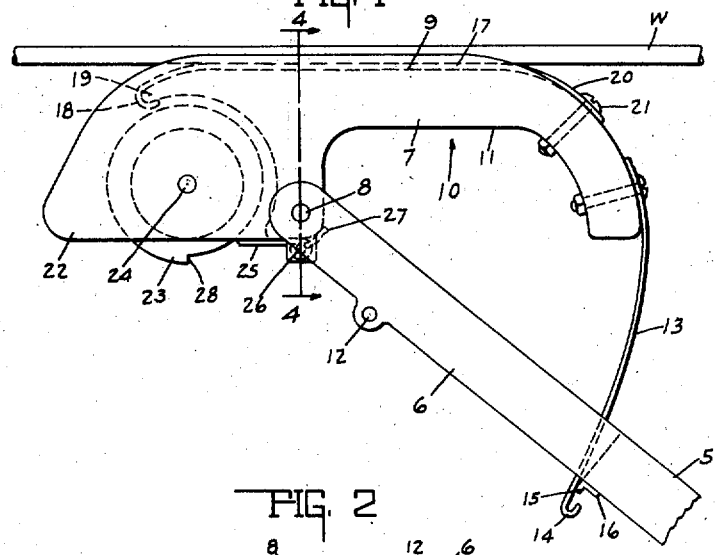
Figure 1 is a side elevation of the device, showing it in use.
Figure 2:
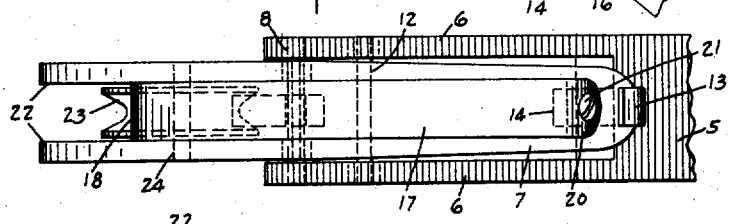
Fig. 2 is a top plan of the device.

Referring to the drawings there is shown a trolley harp 5, which is bifurcated to provide opposed arms 6. A shoe 7 is pivotally secured to the outer ends of the arm 6 by means of a shaft or spindle 8 that extends through an opening formed in the shoe and has its opposed terminals rigidly secured to the arms 6. The shoe 7 is elongated and has an arcuate groove 9 formed thereon which extends along one longitudinal edge thereof. The opposed longitudinal edge of the shoe is cut away to define a recess 10, and the edge 11 of the shoe engages a stop rod or member 12 carried by the arms 6 in order to limit the movement of the shoe about its pivot 8 in one direction. A stop member or strap 13 is secured to the end of the shoe which is remote from the pivot 8 and this strap 13 has a hook 14 formed at the free end thereof, which hook is adapted to coöperate with a flange 15 formed on a plate 16 that is secured to the harp 5. The stop 13 limits the upward movement of the shoe about its pivot but is of sufficient length to permit the shoe 7 to slidably engage the trolley wire W.

In order to prolong the life of the shoe a detachable wear-plate 17 is provided, and this plate is curved transversely to conform to the contour of the groove 9. This plate is elongated to present a relatively long wearing surface to the trolley wire which is engaged by the plate. One end of the plate 17 is reduced to provide an attaching hook 18 which extends longitudinally from the plate 17 and hooks under an overhanging portion or lug 19 formed on the shoe 7, while the opposed end of the plate 17 is flattened to provide an attaching ear 20 that is rigidly secured to the shoe 7 by means of a screw or other securing device 21.

That end of the shoe which is remote from the stop member 13 is cut away to provide spaced walls 22 and a trolley wheel 23 is rotatably mounted on a shaft 24 that is supported by the walls 22. This wheel rotates freely in one direction, but its rotary movement is limited in the opposite direction by means of a pawl 25 that is pivotally secured to the shoe, as shown at 26. A resilient member or finger 27 is carried by the pawl 25 and engages the shoe 7 to normally hold the free end of the pawl in the path of travel of a shoulder 28 formed on the periphery of the wheel 23.

Figure 3:
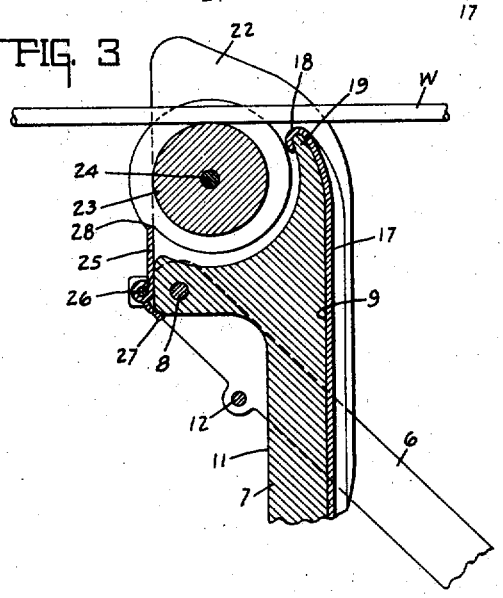
Fig. 3 is a longitudinal sectional view of the device, showing it in the position it assumes when the car is backing.
Figure 4:
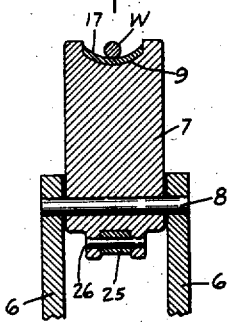
Fig. 4 is a transverse sectional view taken on the line 4—4 of Fig. 1.

In operation, when the car or vehicle to which the device is attached is moving forwardly then the shoe 7 will assume the position shown in Fig. 1 which permits the wear-plate 17 to slidably engage the trolley or conductor W, thereby forming a relatively long wiping or sliding contact between the wire W and the shoe 7. When the car is moving rearwardly, then the shoe 7 will turn upon its pivot 8 and assume the position shown in Fig. 3, in which position the wheel 23 engages the wire W and readily rotates about its shaft 24 thus allowing the continued movement of the vehicle in this direction. In this position the walls 22 of the shoe straddle the wire W and prevent the disengagement of the wheel from the wire. The turning of the shoe 7 about its pivot 8 when the car is moved rearwardly is permitted by the relatively short contact or bearing portion of the shoe against the conductor W in the rear of a vertical plane passing through the pivot member 8, which enables the friction between the conductor and the shoe to overcome the tendency of the shoe to slide on the conductor, and consequently cause the shoe to roll on the conductor until the wheel 23 engages this conductor. If the direction of travel of the car is reversed and it moves forwardly, the shoulder 28 of the wheel 23 will engage the pawl 25 and check the rotation of the wheel in this direction. This action causes the wheel 23 to drag on the wire W and moves the shoe 7 into engagement with the wire.

The invention claimed is:

1. A device of the class described including a trolley harp for making electrical contact with a trolley wire, a shoe pivotally secured to said harp and adapted to slidably engage the trolley wire when the trolley is moving in one direction, and a trolley wheel carried by the shoe and adapted to engage the trolley wire when the trolley is moving in the opposite direction.

2. A device of the class described including a trolley harp for making electrical contact with a trolley wire, a contact member carried by said harp in position to engage and make contact with said wire only when the trolley is moving in one direction, and a second contact member carried by said harp and adapted to engage the trolley wire when the trolley is moving in the opposite direction, one of said members being disengaged from said wire when the other member is in engagement therewith.

3. A device of the class described including a trolley harp for making electrical contact with a trolley wire, a contact member carried by said harp in position to engage and make contact with said wire when the trolley is moving in one direction, a second contact member carried by said harp and adapted to engage the trolley wire when the trolley is moving in the opposite direction, and means for causing one of said members to move to inoperative position and disengage said wire upon the engagement thereof by the other member.

4. A device of the class described including a trolley harp, a shoe pivotally secured to said harp, means for limiting the movements of the shoe about its pivot, a trolley wheel rotatably secured to the shoe, and means for limiting the rotation of the trolley wheel in one direction and permitting free rotation of the said wheel in the opposite direction.

5. A device of the class described including a trolley harp, a shoe pivotally secured to said harp, a detachable wear-plate carried by the shoe and adapted to slidably engage the trolley wire when the trolley is moving in one direction, and a trolley wheel carried by the shoe and adapted to engage the trolley wire when the trolley is moving in the opposite direction.

6. A device of the class described including a trolley harp, a shoe pivotally secured to the said harp, a detachable wear-plate carried by the shoe, means for limiting the movements of the shoe about its pivot, a trolley wheel rotatably secured to the shoe, and means for limiting the rotation of the trolley wheel in one direction and permitting free rotation of the said wheel in the opposite direction.

7. A device of the class described including a trolley harp, an elongated shoe pivotally secured to the trolley harp, said shoe having a groove extending longitudinally therein, a wear-plate received within the groove, means for detachably securing the wear-plate to the shoe, stop members adapted to limit the movements of the shoe about its pivot, a trolley wheel rotatably secured to the harp, and means for limiting the rotation of the said wheel in one direction and permitting free rotation in the opposed direction.

8. A device of the class described including a trolley harp making electric contact with a trolley wire, an elongated shoe having a groove extending longitudinally thereof pivotally secured to said harp, means on one end of said shoe adapted to engage said harp for limiting the pivotal movement of said shoe in one direction, means for limiting the movement of said shoe in the opposite direction, a trolley wheel pivotally mounted at one end of said shoe and a pawl pivoted to said shoe for limiting the rotation of said wheel in one direction and permitting free rotation thereof in the opposite direction, said shoe and wheel being so mounted with respect to said harp as to cause the shoe to engage said wire by the friction thereof when the trolley is moving in a forward direction and be moved out of engagement therewith for permitting the free engagement of the trolley wheel when the trolley is moving in the opposite direction.

In witness whereof I have hereunto set my hand at the city of Frankfort, county of Clinton, and State of Indiana, this 6th day of September, 1921.

OTTO MOORE.